(12) United States Patent
Hoshino et al.

(10) Patent No.: US 7,913,168 B2
(45) Date of Patent: Mar. 22, 2011

(54) DISPLAY CONTROL APPARATUS, DISPLAY CONTROL METHOD, DISPLAY CONTROL PROGRAM

(75) Inventors: Naoki Hoshino, Saitama-ken (JP); Yuko Kimoto, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 942 days.

(21) Appl. No.: 11/753,618

(22) Filed: May 25, 2007

(65) Prior Publication Data

US 2008/0294983 A1 Nov. 27, 2008

(51) Int. Cl.
*G06F 17/00* (2006.01)

(52) U.S. Cl. .......................... 715/273; 715/274; 715/276

(58) Field of Classification Search .................. 715/200, 715/273, 274, 276, 277
See application file for complete search history.

(56) References Cited

U.S. PATENT DOCUMENTS

| | | | | |
|---|---|---|---|---|
| 6,041,199 | A * | 3/2000 | Kashimada | 399/82 |
| 7,221,885 | B2 * | 5/2007 | Sato | 399/81 |
| 7,697,170 | B2 * | 4/2010 | Otake et al. | 358/3.28 |
| 7,719,701 | B2 * | 5/2010 | Momose et al. | 358/1.13 |
| 2002/0010806 | A1 * | 1/2002 | Yamade | 709/327 |
| 2002/0080376 | A1 * | 6/2002 | Momose et al. | 358/1.9 |
| 2002/0146256 | A1 * | 10/2002 | Sekiguchi et al. | 399/82 |
| 2005/0105135 | A1 * | 5/2005 | Takahashi | 358/1.18 |
| 2005/0111866 | A1 * | 5/2005 | Sato | 399/79 |
| 2006/0132813 | A1 * | 6/2006 | Mitani et al. | 358/1.13 |
| 2006/0262338 | A1 * | 11/2006 | Momose et al. | 358/1.13 |
| 2007/0133038 | A1 * | 6/2007 | Otake et al. | 358/1.14 |
| 2007/0263244 | A1 * | 11/2007 | Sugitani et al. | 358/1.15 |

FOREIGN PATENT DOCUMENTS

JP 11-053137 2/1999

* cited by examiner

*Primary Examiner* — Stephen S Hong
*Assistant Examiner* — Gregory J Vaughn
(74) *Attorney, Agent, or Firm* — Turocy & Watson, LLP

(57) ABSTRACT

There is provided a technique to contribute to an improvement in convenience of a setting screen for performing setting for a function capable of being executed by an image processing apparatus. A display control apparatus causes plural setting screens to be selectively displayed, which are respectively for performing settings for plural functions capable of being executed by the image processing apparatus and on each of which plural setting items for each of the functions can be displayed, and includes a selection function determination unit to determine that a setting screen for which function among the plural functions has been selected, an item information acquisition unit to acquire information relating to, among the plural setting items relating to the function whose setting screen is determined to have been selected by the selection function determination unit, a setting item to be displayed on the setting screen for the function, and a control unit to display, based on the information acquired by the item information acquisition unit and on the setting screen for the function whose setting screen is determined to have been selected by the selection function determination unit, the setting item to be displayed on the setting screen.

11 Claims, 16 Drawing Sheets

| USER ID | FUNCTION | DISPLAY OBJECT ITEM | USE FREQUENCY (TIMES/MONTH) | DISPLAY POSITION |
|---|---|---|---|---|
| 0001 | PRINT | TWO-SIDED | 27 | FIXED POSITION |
| | | N in 1 | 22 | FIXED POSITION |
| | | STAPLE | 15 | AUTOMATIC UPDATE |
| | | DRAG PRINT | 11 | AUTOMATIC UPDATE |
| | SCAN | RESOLUTION | 20 | FIXED POSITION |
| | | MONOCHROME/COLOR | 17 | AUTOMATIC UPDATE |
| | | IMAGE MODE | 13 | AUTOMATIC UPDATE |
| | FAX | ADDRESS | 35 | FIXED POSITION |
| | | RESOLUTION | 20 | AUTOMATIC UPDATE |
| | | SHEET SIZE | 19 | AUTOMATIC UPDATE |
| | BOX | FILE NAME | 18 | FIXED POSITION |
| 0002 | PRINT | HOMEPAGE PRINT | 17 | FIXED POSITION |
| | | INSERT PAPER | 14 | AUTOMATIC UPDATE |
| | | PAPER FEED METHOD | 12 | AUTOMATIC UPDATE |

FIG.7

| USER ID | FUNCTION | DISPLAY OBJECT ITEM | USE FREQUENCY (TIMES/MONTH) | DISPLAY POSITION |
|---|---|---|---|---|
| 0001 | PRINT | TWO-SIDED | 27 | FIXED POSITION |
| | | N in 1 | 22 | FIXED POSITION |
| | | STAPLE | 15 | AUTOMATIC UPDATE |
| | | DRAG PRINT | 11 | AUTOMATIC UPDATE |
| | SCAN | RESOLUTION | 20 | FIXED POSITION |
| | | MONOCHROME/COLOR | 17 | AUTOMATIC UPDATE |
| | | IMAGE MODE | 13 | AUTOMATIC UPDATE |
| | FAX | ADDRESS | 35 | FIXED POSITION |
| | | RESOLUTION | 20 | AUTOMATIC UPDATE |
| | | SHEET SIZE | 19 | AUTOMATIC UPDATE |
| | BOX | FILE NAME | 18 | FIXED POSITION |
| 0002 | PRINT | HOMEPAGE PRINT | 17 | FIXED POSITION |
| | | INSERT PAPER | 14 | AUTOMATIC UPDATE |
| | | PAPER FEED METHOD | 12 | AUTOMATIC UPDATE |
| | | | | |

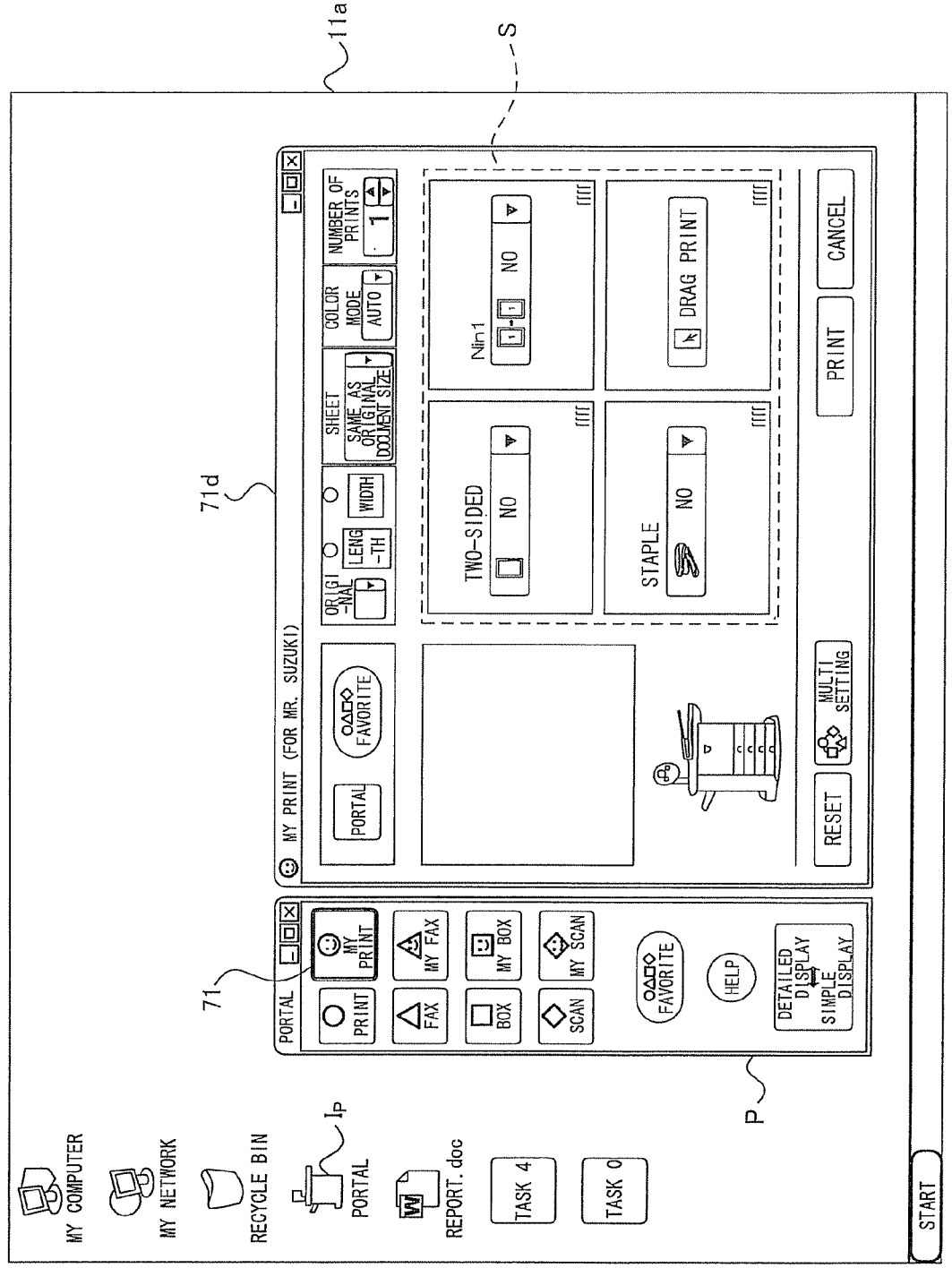

DISPLAY CONTROL APPARATUS, DISPLAY CONTROL METHOD, DISPLAY CONTROL PROGRAM

BACKGROUND OF THE INVENTION

1. Field of the Invention

The present invention relates to a display technique of a setting screen for performing setting for a function capable of being executed by an image processing apparatus, and particularly to a technique to contribute to an improvement in convenience of a setting screen.

2. Description of the Related Art

Hitherto, in an image processing apparatus having a printer function and a fax function, a printer driver screen and a fax driver screen (hereinafter referred to as a setting screen) are used as setting screens for performing a print processing and a fax transmission-reception processing.

In the setting screen as stated above, various settings relating to the print processing, the fax transmission-reception processing or the like can be performed, and the number of setting items is generally very large.

In a general usual setting screen, although plural setting items are listed on one screen, from the restriction of a display area of the screen, it is difficult to list all of the many setting items on one screen. Besides, when the image processing apparatus is usually used, a relatively simple operation is performed in most cases, and there is a low possibility of using a setting item whose use frequency is statistically low or a setting item which requires a very high degree of knowledge.

Then, on an usual setting screen, in view of the convenience of the user who performs a setting operation, a hierarchical structure using a tab display or the like is used, and a setting item having a low possibility of being used is displayed in a deep hierarchy, or a button for selecting a special setting item or a pull-down menu is provided.

However, the arrangement of the setting items on the usual setting screen is strictly based on the statistic point of view, and it can be hardly said that the setting items with high use frequencies are conveniently arranged for all users.

For example, in the case where the user who frequently uses a setting item whose use frequency is statistically low or a setting item (staple, hole punch or the like as an option) requiring a high degree of knowledge operates the usual setting screen, an operation including many steps, such as tab switching, menu selection and display of another screen, must be frequently performed before a desired setting item is found, and this causes the efficiency of setting work to be reduced.

Besides, on a usual setting screen, there is known a structure in which the specific setting content of a user is previously set as "favorite", and similar setting content can be simply reused from the next time. However, such specific setting content can not be always reused, and there is a problem that flexibility is lacking.

SUMMARY OF THE INVENTION

An embodiment of the invention has an object to provide a technique to contribute to an improvement in convenience of a setting screen for performing setting for a function capable of being executed by an image processing apparatus.

In order to solve the problem, a display control apparatus according to an aspect of the invention causes plural setting screens to be selectively displayed, which are respectively for performing settings for plural functions capable of being executed by an image processing apparatus and on each of which plural setting items for each of the functions can be displayed, and the display control apparatus includes a selection function determination unit to determine that a setting screen for which function among the plural functions has been selected, an item information acquisition unit to acquire information relating to, among the plural setting items relating to the function whose setting screen is determined to have been selected by the selection function determination unit, a setting item to be displayed on the setting screen for the function, and a control unit to display, based on the information acquired by the item information acquisition unit and on the setting screen for the function whose setting screen is determined to have been selected by the selection function determination unit, the setting item to be displayed on the setting screen.

Besides, a display control method according to another aspect of the invention is a display control method for a display control apparatus causing plural setting screens to be selectively displayed, which are respectively for performing settings for plural functions capable of being executed by an image processing apparatus and on each of which plural setting items for each of the functions can be displayed, and includes a selection function determination step of determining that a setting screen for which function among the plural functions has been selected, an item information acquisition step of acquiring information relating to, among the plural setting items relating to the function whose setting screen is determined to have been selected at the selection function determination step, a setting item to be displayed on the setting screen for the function, and a control step of displaying, based on the information acquired at the item information acquisition step and on the setting screen for the function whose setting screen is determined to have been selected at the selection function determination step, the setting item to be displayed on the setting screen.

Besides, a display control program according to another aspect of the invention is a display control program for causing a computer to execute a display control processing in a display control apparatus causing plural setting screens to be selectively displayed, which are respectively for performing settings for plural functions capable of being executed by an image processing apparatus and on each of which plural setting items for each of the functions can be displayed, and the display control program causes the computer to execute a selection function determination step of determining that a setting screen for which function among the plural functions has been selected, an item information acquisition step of acquiring information relating to, among the plural setting items relating to the function whose setting screen is determined to have been selected at the selection function determination step, a setting item to be displayed on the setting screen for the function, and a control step of displaying, based on the information acquired at the item information acquisition step and on the setting screen for the function whose setting screen is determined to have been selected at the selection function determination step, the setting item to be displayed on the setting screen.

DESCRIPTION OF THE DRAWINGS

FIG. 5 is a view showing a state in which a portal screen P is displayed on a screen of the display 11a.

FIG. 7 is a view showing an example of a data table in which information acquired by an item information acquisition unit 112 is stored.

FIG. 8 is a view showing a display example of setting items on a print setting screen 71d by a control unit 113.

DESCRIPTION OF THE EMBODIMENTS

Hereinafter, an embodiment of the invention will be described with reference to the drawings.

Figure 1:
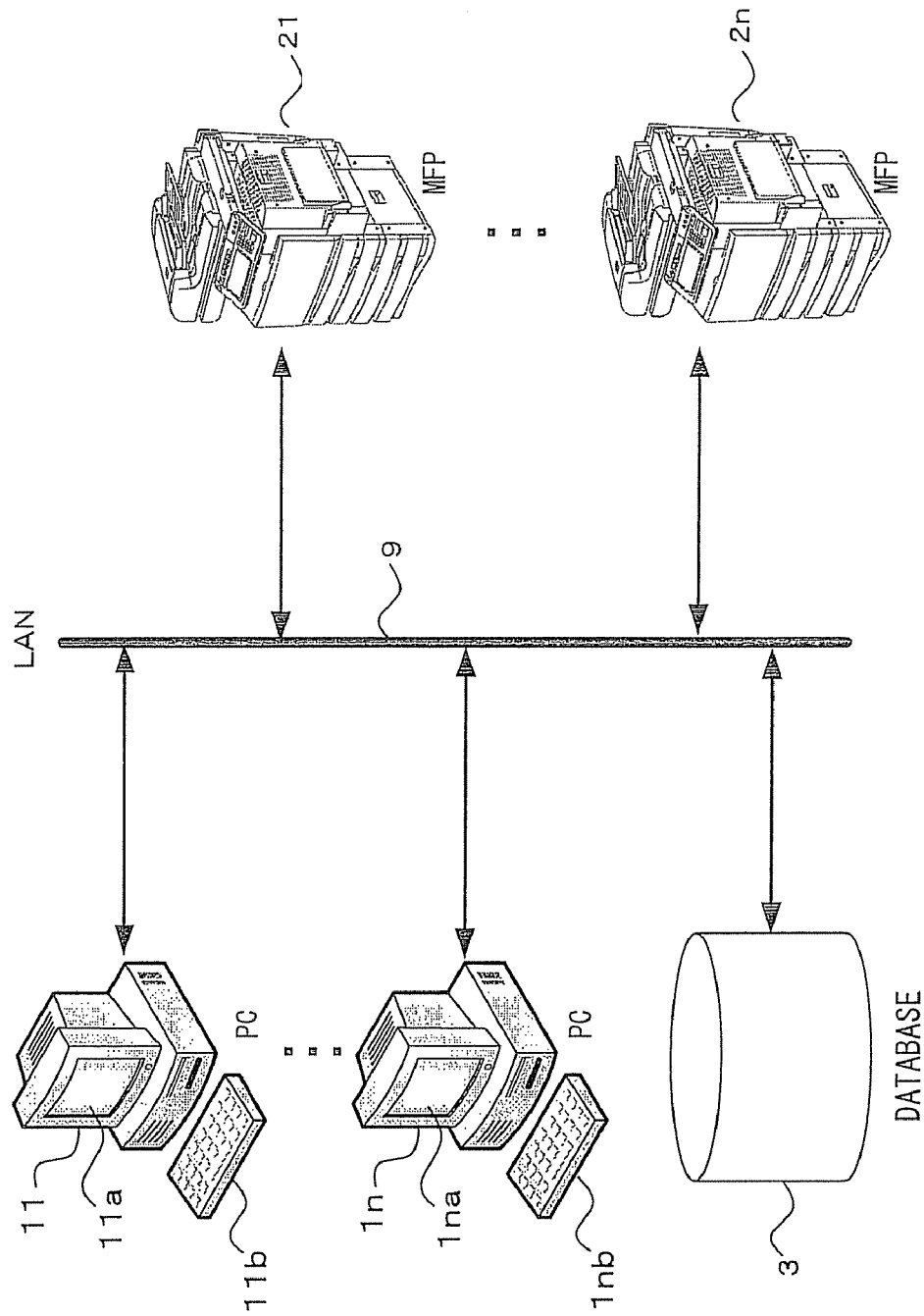
FIG. 1 is a view showing a structure of a display control system including a PC (display control apparatus) 11 according to an embodiment of the invention and an image processing apparatus 21.

FIG. 1 is a view showing a structure of a display control system including a PC (display control apparatus) 11 according to an embodiment of the invention and an image processing apparatus 21. In the display control system shown in the drawing, the PCs (Person Computer) 11 to 1n, the image processing apparatuses 21 to 2n, and a database 3 are connected to be capable of communicating with each other through an electric communication line such as a LAN 9.

Here, with respect to the PCs 11 to 1n, the image processing apparatuses 21 to 2n, and the database 3, although means for connecting them to be capable of communicating with each other is the LAN, no limitation is made to this, and the Internet, WAN or the like may be used (incidentally, it may be wired or wireless). The PC11 to in can perform various settings relating to image processing functions capable of being executed by the image processing apparatuses 21 to 2n, or execution instructions of image processing to the image processing apparatuses 21 to 2n.

The instructions or the like to the image processing apparatuses 21 to 2n from the PCs 11 to 1n are performed by drivers installed in the PCs 11 to 1n based on operation input using operation input units (for example, keyboards or mice) by users who see the setting screens displayed on the displays 11a to 1na provided in the PCs 11 to 1n. Incidentally, here, although the example is shown in which the display and the operation input unit are individually provided, no limitation is made to this, and for example, the functions of the display and the operation input unit may be realized by a touch panel display.

The database 3 serves as a storage area to store various setting information used in the PCs 11 to 1n and the image processing apparatuses 21 to 2n.

Figure 2:
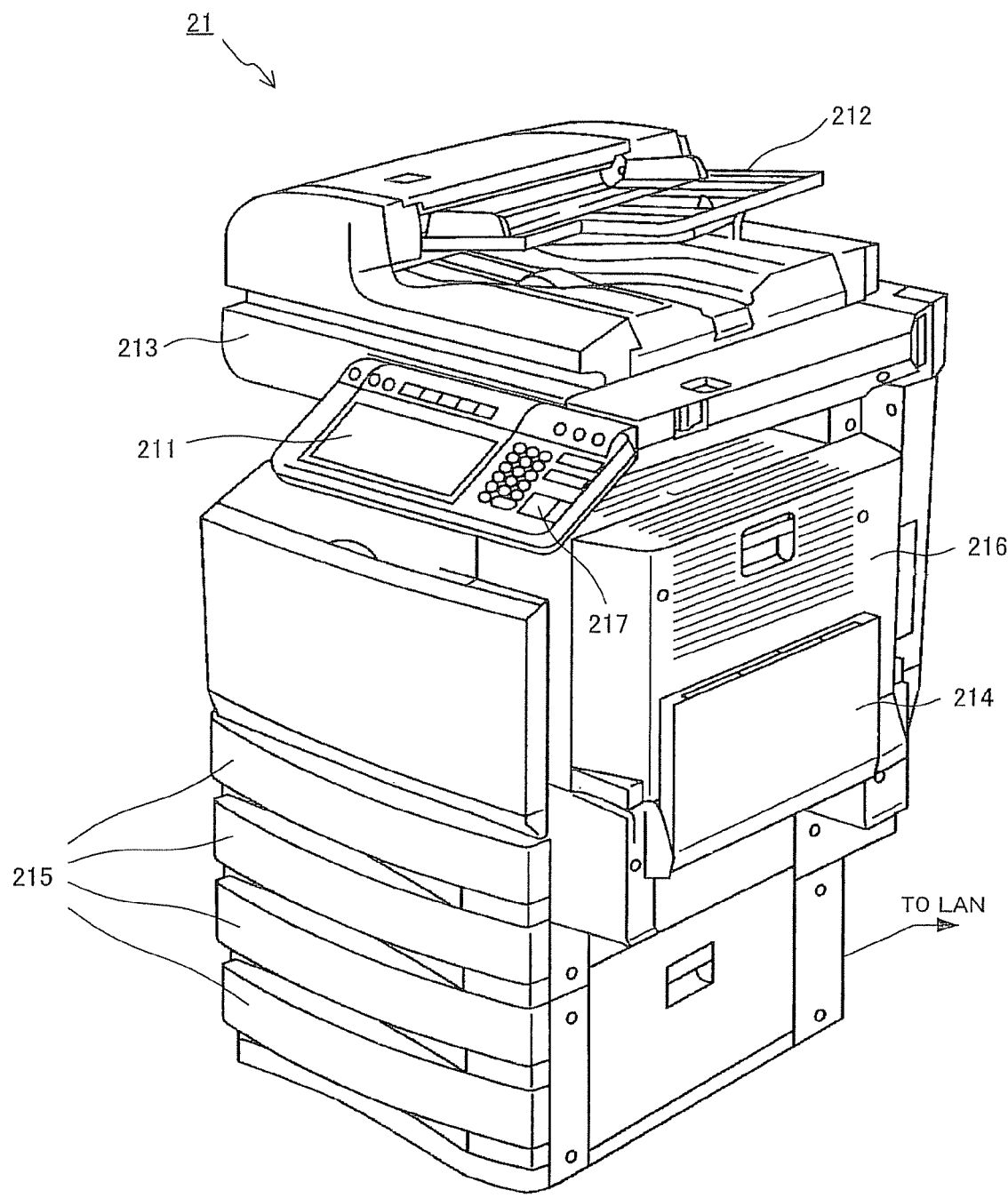
FIG. 2 is an outer appearance perspective view for explaining the outline of the image processing apparatus 21 of the embodiment.

FIG. 2 is an outer appearance perspective view for explaining the outline of the image processing apparatus 21 of the embodiment. Here, an example in which the image processing apparatus 21 is an MFP (Multi Function Peripheral) will be described as an example.

The image processing apparatus 21 of the embodiment includes an interface screen 211, an ADF (Auto Document Feeder) 212, an image reading unit 213, a manual paper feed unit 214, paper feed cassettes 215, an image formation unit 216 and an authentication processing unit 217.

Hereinafter, an example of an operation of the image processing apparatus 21 of the embodiment will be described in brief. In the case where a copy processing (specified image processing) is performed in the image processing apparatus 21, first, authentication processing of a user is performed in the authentication processing unit 217. Next, based on the operation input of the user, who succeeded in the authentication processing, to the interface screen 211, an original document set on the ADF 212 is automatically conveyed to an original document read position of the image reading unit 213. An image of the original document conveyed in this way is read by the image reading unit 213. Then, by a paper feed method selected based on the operation input to the interface screen 211, a paper feed operation is performed through either one of the paper feed cassette 215 and the manual paper feed unit 214. The fed sheet is conveyed to the image formation unit (image processing unit) 216 and is subjected to an image formation processing based on the image read by the image reading unit 213, and the copy processing is completed.

Incidentally, the interface screen 211 is constructed of, for example, a touch panel display, and also serves as an operation input unit to receive the operation input of the user based on the display content on the interface screen 211.

The image processing apparatus 21 can perform specified processings different from each other, such as a "print function" in which a print processing is performed based on the image data acquired by the image processing apparatus 21, a "fax function" in which the image data (image data obtained by scanning an original document or image data received from an external equipment) acquired by the image processing apparatus 21 is faxed to a desired destination, a "scan function" to scan the image of an original document, and a "box function" in which the image data read from the original document by the "scan function" in the image processing apparatus 21 is stored in a desired storage area. Incidentally, the "scan function" and the "print function" are combined and performed, so that copy processing can be performed.

Processing objects of the above specified processings in the image processing apparatus 21 include, for example, a sheet original document, a book-form original document and image data.

Figure 3:
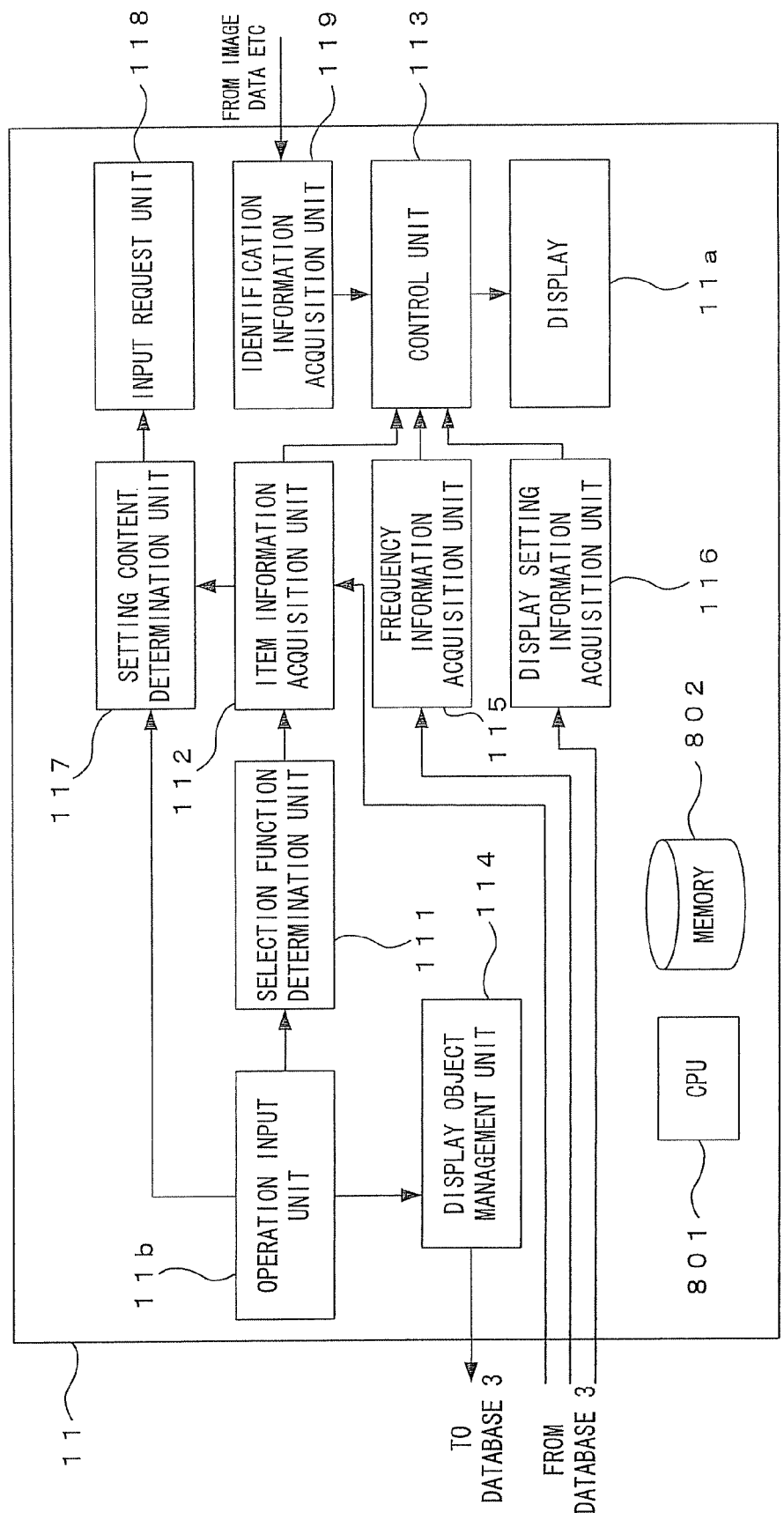
FIG. 3 is a functional block diagram for explaining the PC (display control apparatus) 11 of the embodiment.

FIG. 3 is a functional block diagram for explaining the PC (display control apparatus) 11 of the embodiment. In this embodiment, the PC 11 to PC 1n have the same component portion, and the image processing apparatus 21 to 2n also have the same component portion. Since the display control system of the embodiment can be realized by one of the image processing apparatus 21 to the image processing apparatus 2n and one of the PC 11 to the PC 1*n*, hereinafter, as one example, the functions of the display control system including the image processing apparatus 21 and the PC 11 will be described in detail.

The PC 11 of this embodiment causes plural setting screens (printer driver screen, fax driver screen, scanner driver screen, etc.) to be displayed so as to be capable of being selected and changed, and the plural setting screens are for performing settings for plural functions (for example, print function, fax function, scan function, box function, etc.) capable of being executed by the image processing apparatus 21, and plural setting items for each of the functions can be displayed on each of the setting screens.

Specifically, the PC 11 of the embodiment includes a selection function determination unit 111, an item information acquisition unit 112, a control unit 113, a display object management unit 114, a frequency information acquisition unit 115, a display setting information acquisition unit 116, a setting content determination unit 117, an input request unit 118, an identification information acquisition unit 119, a display 11*a*, an operation input unit 11*b*, a CPU 801, and a MEMORY 802.

Hereinafter, the operation of the PC 11 of the embodiment will be described in detail.

Incidentally, in the following example, for convenience of explanation, the setting screen for the print function will be mainly described, however, it is needless to say that a similar processing can be performed on the other functions (fax function, scan function, box function) in addition to the print function.

Figure 4:
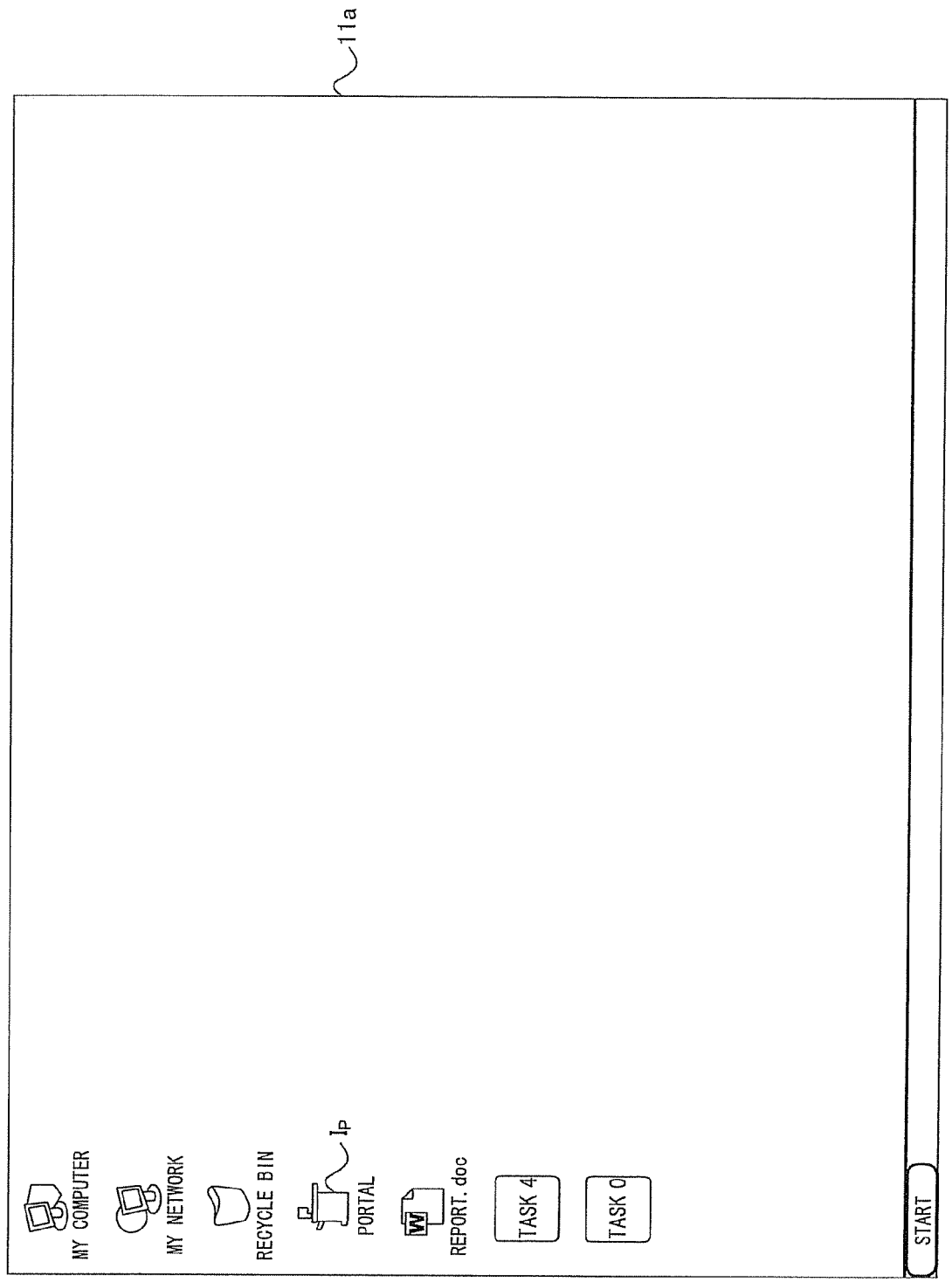
FIG. 4 is a view showing an example of a display screen of a display 11a of the PC 11.

FIG. 4 is a view showing an example of a display screen of the display 11*a* of the PC 11. A "portal" icon Ip as well as various icons, such as "my computer" and "my network", are displayed on the display 11*a*.

Figure 5:
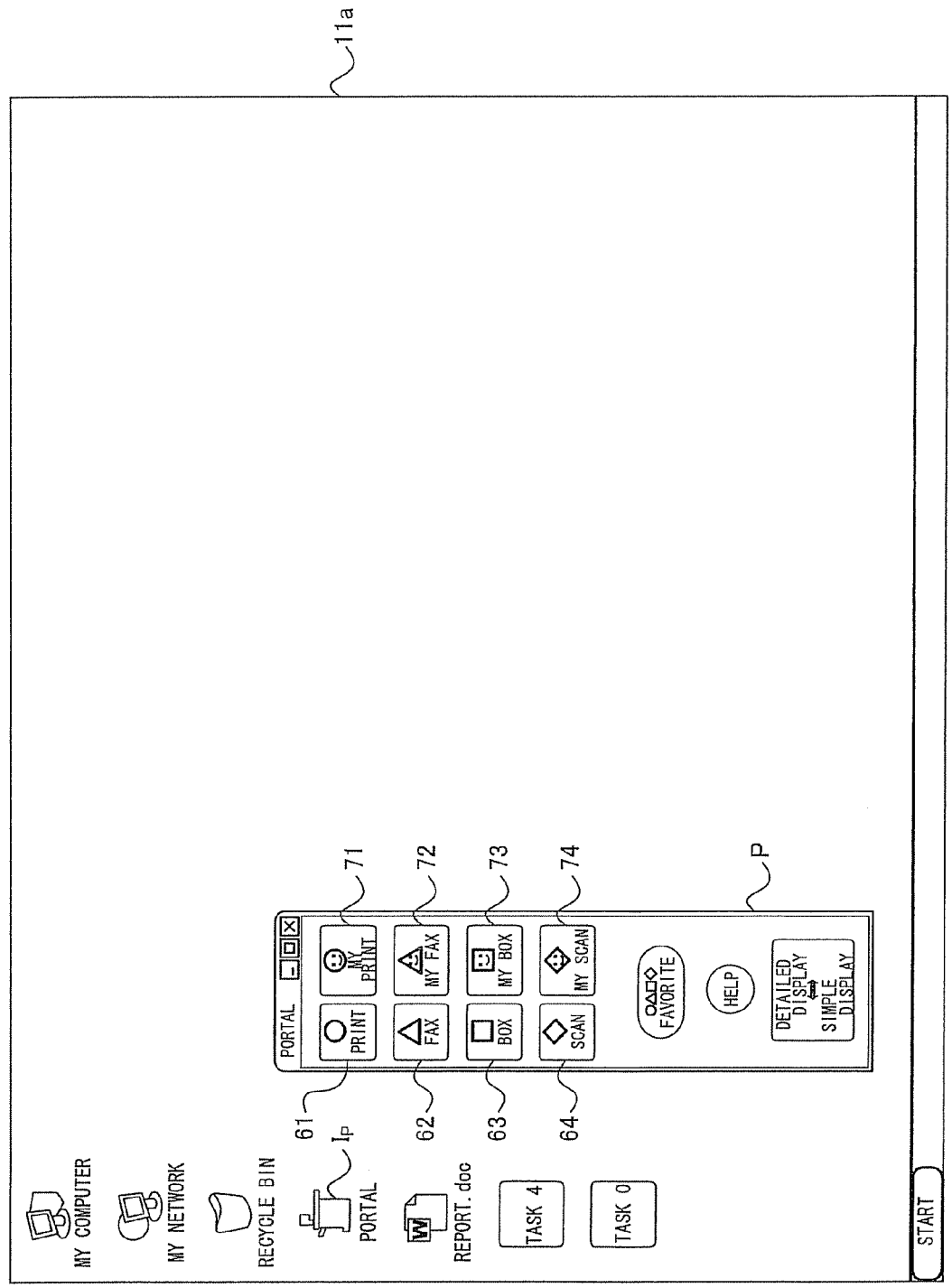

When the user selects this "portal" icon Ip by the operation input (double click) to the operation input unit 11*b*, a portal screen P as shown in FIG. 5 is displayed on the screen of the display 11*a*. Buttons 61 to 64 to open setting screens for performing usual standard function settings, and buttons 71 to 74 to open setting screens (my setting screens) corresponding to the respective functions which each user can customize are displayed on the portal screen P.

Figure 6:
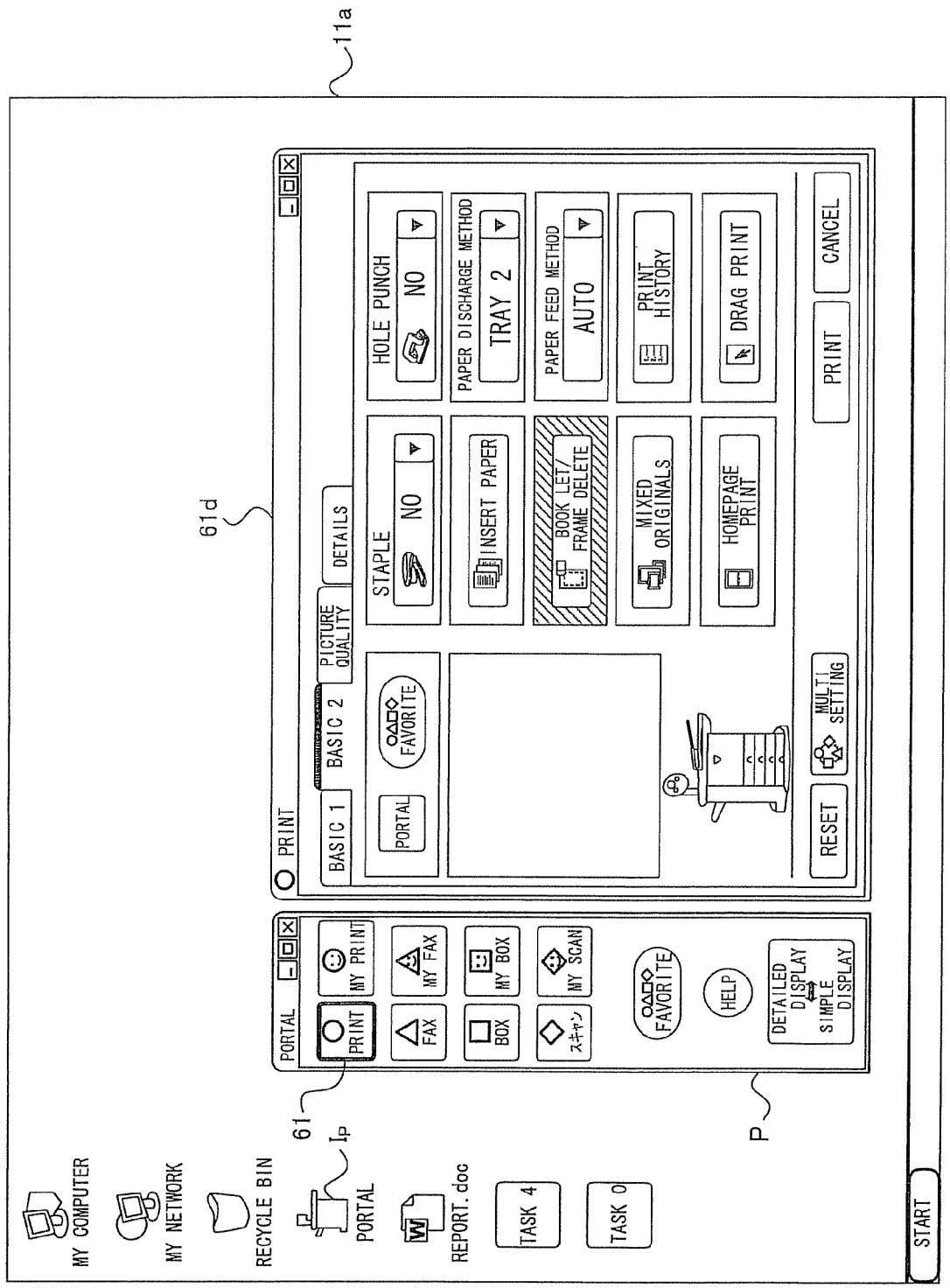
FIG. 6 is a view showing a display state of a standard print setting screen 61d.

Here, in the case where the user desires to perform, for example, the print setting on the standard setting screen for the print function, the button 61 is selected by the operation input unit 11*b*, so that a standard print setting screen 61*d* as shown in FIG. 6 can be displayed (hereinafter, the state in which a button on the screen is selected is represented by enclosing it with a thick line as shown in FIG. 6).

On the other hand, in the case where the user desires to use the print setting screen which can be customized, when the button 71 is selected by the operation input unit 11*b*, the selection function determination unit 111 determines that based on the user's operation input to the operation input unit 11*b*, a setting screen for which function among the plural functions has been selected.

The item information acquisition unit 112 acquires, among plural setting items (setting items concerning, for example, two-sided printing, paper discharge method, Nin1 printing, staple processing, hole punch processing, etc.) which can be set for the function (here, the print function) whose setting screen is determined to have been selected by the selection function determination unit 111, information relating to a setting item to be displayed on the print setting screen 71*d* for the function from the database 3. FIG. 7 is a view showing an example of a data table in which information to be acquired by the item information acquisition unit 112 is stored. In this embodiment, setting items whose use frequencies exceed a specified threshold (for example, ten times per month) among plural setting items for plural functions capable of being executed by the image processing apparatus 21 are registered, as setting items to be displayed on the setting screens, by the display object management unit 114 into the data table (FIG. 7). Of course, the specified threshold can be arbitrarily changed by the user as the need arises.

The identification information acquisition unit 119 acquires, based on information (stored in, for example, the MEMORY 802) of authentication log or the like at the time of login of the user in the PC 11, the user name and the user ID of the user who performs the setting operation on the setting screen. In addition, the identification information acquisition unit 119 can acquire, based on the header information of the image data and the information transmitted from the application, identification information to specify at least one of the file format of image data as the object of the image processing in the image processing apparatus 21 and the kind of an application to process the image data. As stated above, by specifying the file format of the image data and the kind of the application, it becomes possible to display the setting items frequently used in the case where the file of the specific file format is treated or in the case where the specific application is used, and this can contribute to an improvement in convenience of working environment.

Based on the information acquired by the item information acquisition unit 112 and the identification information acquisition unit 119, the control unit 113 displays, in a specific display area S of the setting screen (here, the print setting screen 71*d*) for the function whose setting screen is determined to have been selected by the selection function determination unit 111, the setting item (setting item to be displayed on the setting screen) which is made to correspond to at least one of the user who performs the setting operation, the file format and the application.

Specifically, the item information acquisition unit 112 here acquires identification information (ID etc.) of "two-sided", "Nin1", "staple" and "drag print" which are the setting items to be displayed on the setting screen in the case where the user of the user ID "0001" shown in FIG. 7 selects the "print function". FIG. 8 is a view showing a display example of the setting items in the print setting screen 71*d* by the control unit 113.

As stated above, among various setting items corresponding to the plural functions of the image processing apparatus, only the setting items to be displayed on the setting screen are selectively displayed on the setting screen, so that the visible property of various setting items is improved and the screen display can be performed, and it is possible to provide the interface screen on which the setting is easy for the user to perform.

Incidentally, although the number of setting items to be displayed in the display area S at one time can be set to a specified number by default, it may be arbitrarily set based on the operation input of the user. Besides, when the size of an icon image of the setting item listed in the display area S and the size of a character indicating each setting item are changed according to the display number thereof (in the case where the number of items is small, an area used for one item is increased and the character size is made large), this can further contribute to an improvement in visibility of each setting item.

Besides, as stated above, with respect to different setting items to be generally displayed in separate tabs in the printer driver or setting items generally positioned in a deep hierarchy (for example, setting item with generally low use frequency), one having a high use frequency is registered as a display object on the setting screen, so that the visibility in the setting operation and the operationality are improved.

Besides, in this embodiment, information relating to the use frequency of each of plural setting items for plural image processing functions capable of being executed by the image processing apparatus is sequentially stored in the data table (see FIG. 7) stored in the database 3, and the information relating to the use frequency is acquired from the data table by the frequency information acquisition unit 115.

The control unit 113 displays a setting item with a high use frequency to be positioned at at least one side of the left side and the upper side in the specified display area of the setting screen based on the information acquired by the frequency information acquisition unit 115 (see FIG. 8).

As stated above, the setting item with the high use frequency is displayed at the position with high priority on the setting screen, so that the setting item which is frequently used can be displayed at the noticeable position, and this can contribute to the improvement in operationability. Besides, since the display of the setting item is performed according to the use frequency, the dynamic display of the setting item becomes possible such that an item with a low use frequency is moved to a lower level each time the display object is updated, and an item with a high use frequency is moved to an upper level. Incidentally, in a display area H other than the specified display area S (for example, the upper side or left side of the specified display area S), inevitable setting items (sheet size, sheet direction, color mode, number of prints, etc.) previously determined as the setting items used on the setting screen without fail or as the setting items with very high use frequencies are fixedly displayed on the setting screen, and setting items to be made the display objects among the setting items other than the inevitable setting items are displayed in the specified display area S, so that the inevitable setting items can be easily searched at the time of setting for each function, and this can contribute to the improvement in operationability.

Next, a procedure of registering a setting item as a display object using the operation input unit 11b will be described.

Figure 9:
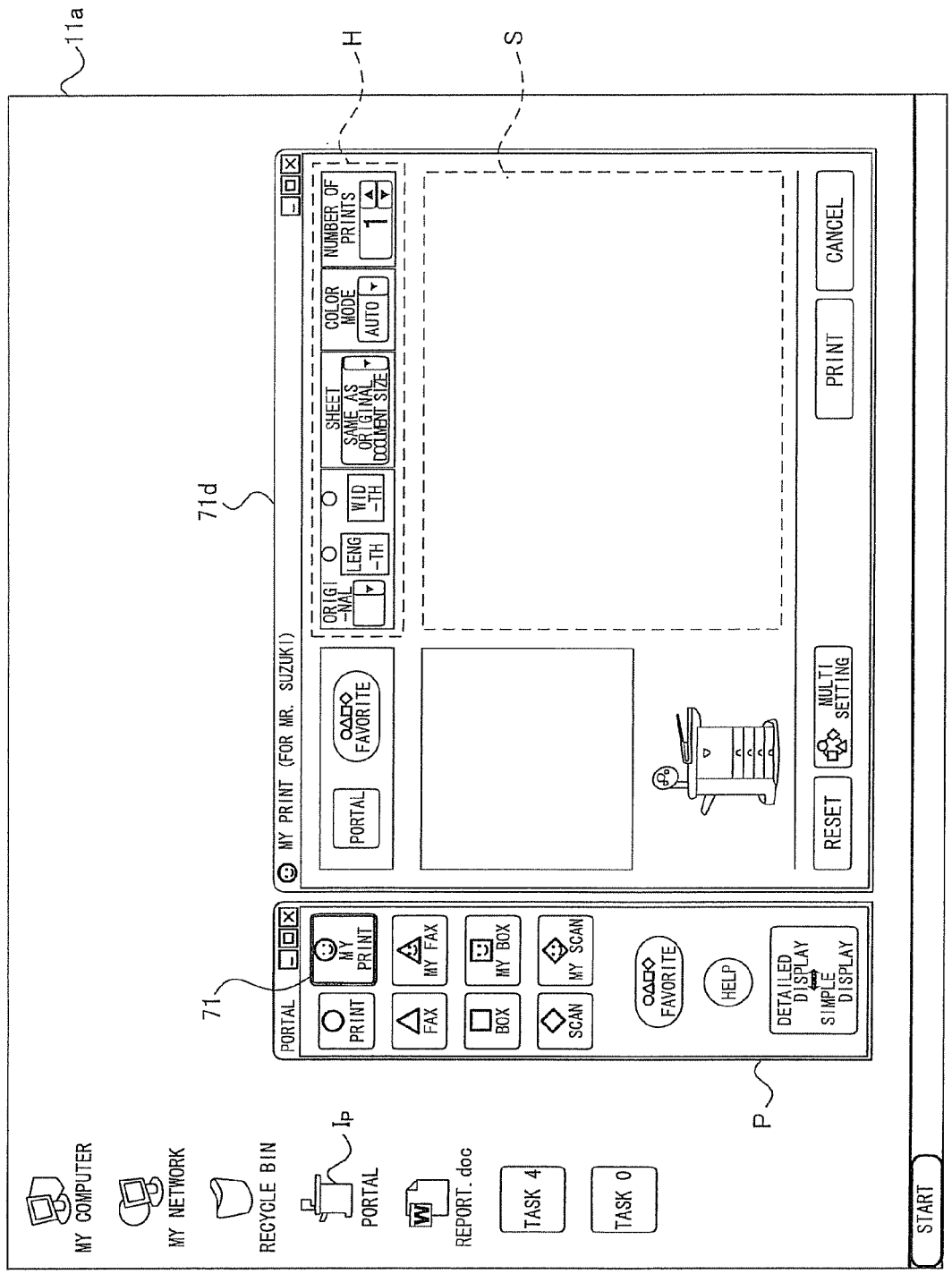
FIG. 9 is a view showing a print setting screen 71d displayed on a screen in a case where a "my print" button 71 is selected in a state where a setting item to be displayed in a specified display area S is not registered.

FIG. 9 is a view showing a print setting screen 71d displayed in the case where the "my print" button 71 is selected in a state where a setting item to be displayed in the specified display area S is not registered.

Figure 10:
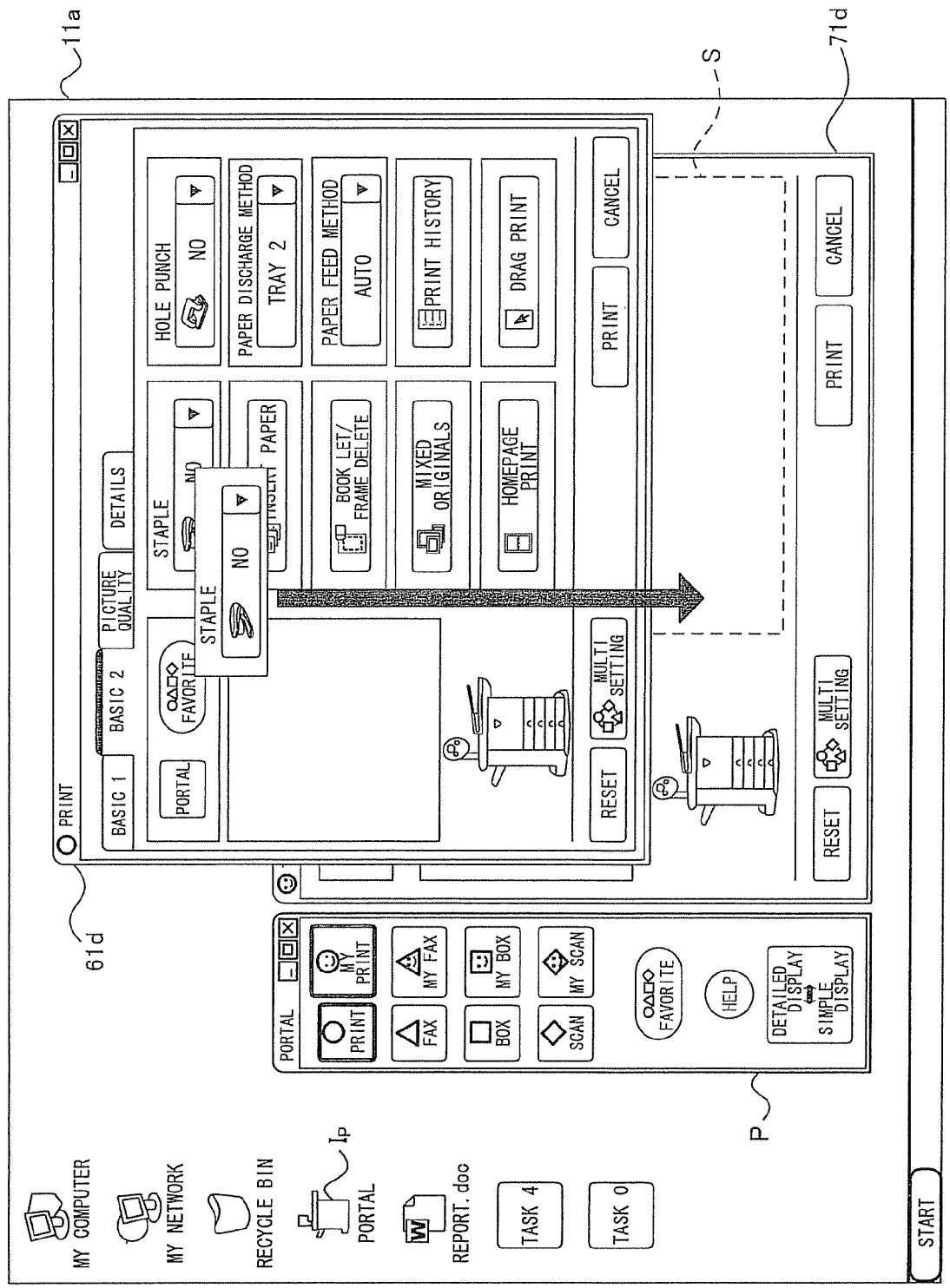
FIG. 10 is a view showing the print setting screen 61d and the print setting screen 71d.

In the state of FIG. 9, when the user selects the "print" button 61 on the portal screen P, as shown in FIG. 10, a standard print setting screen 61d, together with the print setting screen 71d, is displayed.

Among the plural setting items displayed on the print setting screen 61d displayed in this way, the user drags a setting item (here, "staple" is selected), which is desires to be displayed (to be added as the setting item of the private setting screen) on the display area S of the print setting screen 71d, by a mouse or the like, moves it onto the display area S of the print setting screen 71d, and drops it (see an arrow in FIG. 10).

Figure 11:
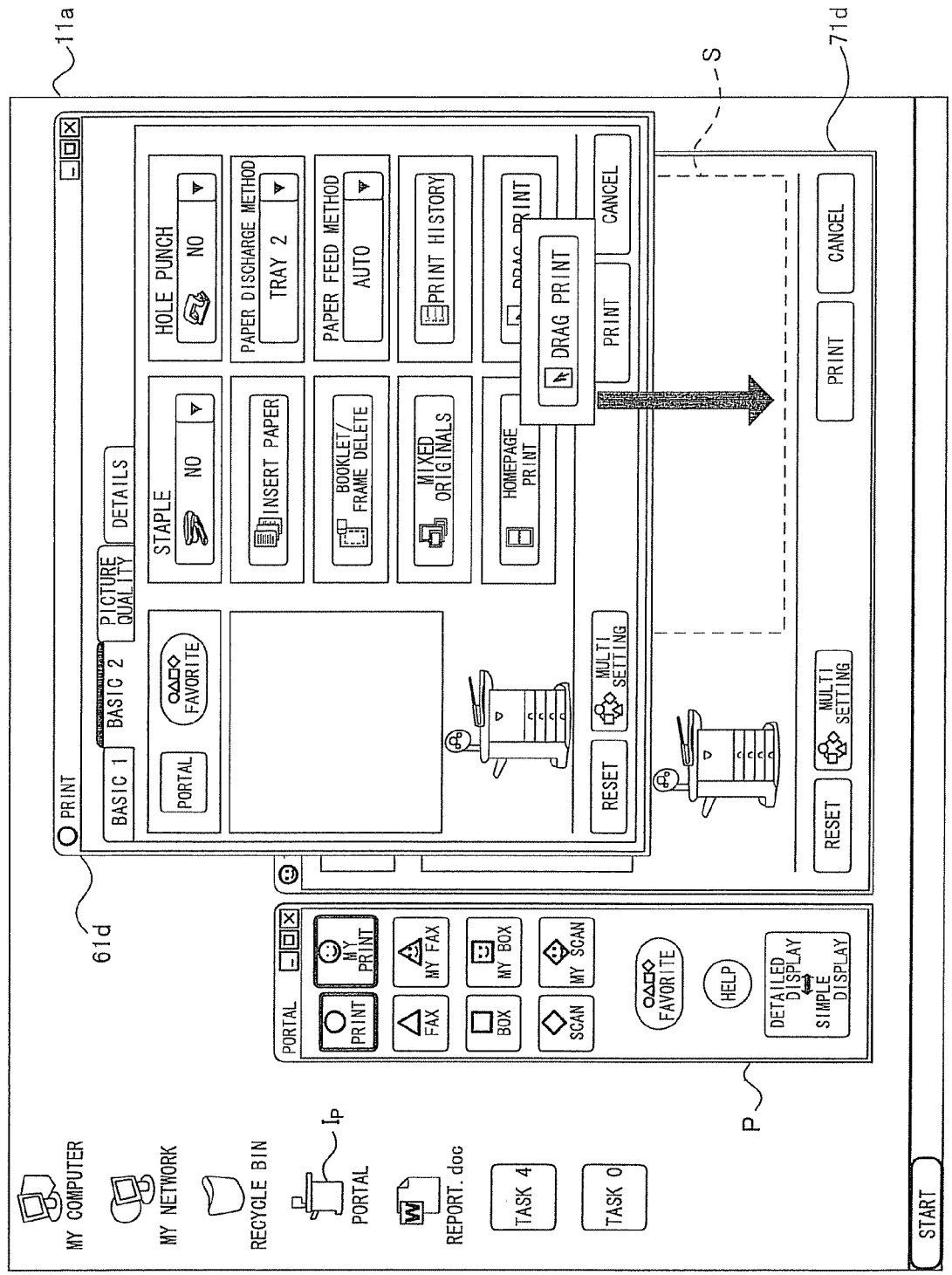
FIG. 11 is a view showing an operation to further add a desired setting item as a display object.

In the case where the user desires to further add a setting item, as shown in FIG. 11, the user drags the setting item (here, "hole punch" is selected) which is desired to be added as the display object, moves it onto the display area S of the print setting screen 71d, and drops it (see an arrow in FIG. 11).

Figure 12:
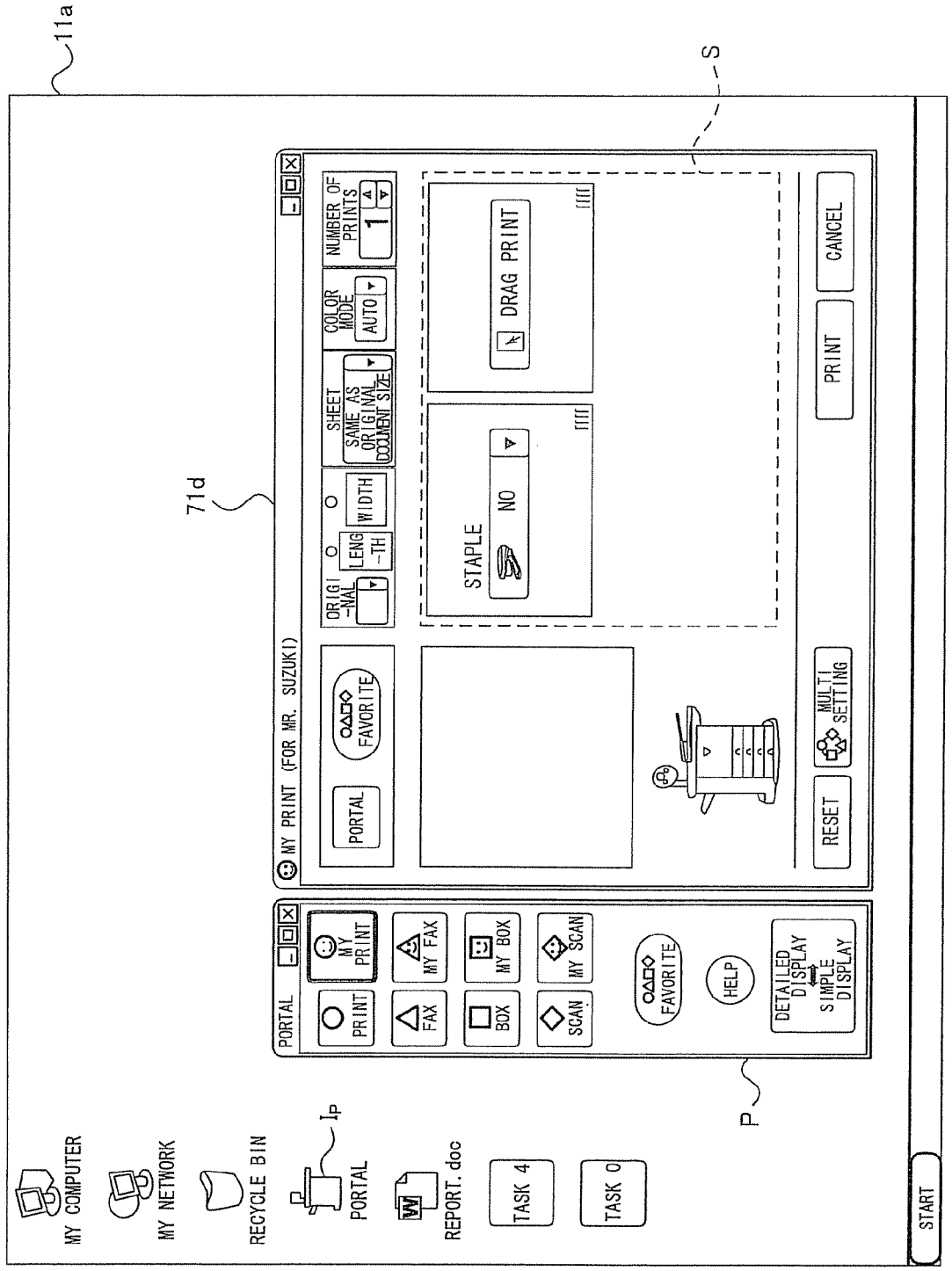
FIG. 12 is a view showing an example of the print setting screen 71d after a registration processing of a setting item.

When the desired setting item is made to be capable of being registered as the display object in the display area S of the print setting screen 71d by performing the foregoing drag-and-drop operation, it becomes possible to customize the setting screen at a higher degree of freedom. FIG. 12 is a view showing an example of the print setting screen 71d after the registration processing of the setting item as stated above.

Incidentally, in this embodiment, a setting item which can be registered as a display object in the display area S of the print setting screen 71d by the drag-and-drop operation is made such that its background color on the print setting screen 61d is a thin color, and a setting item which can not be registered (the drag-and-drop can not be performed) is made such that its background color is a dense color (for example, see "booklet/frame deletion" in FIG. 6). By this, the user can visually grasp the setting item which can be registered as the display object in the display area S of the print setting screen 71d.

Besides, in the embodiment, the setting item is added as the display object in the specified display area S of the print setting screen 71d based on the use frequency or the drag-and-drop operation, however, in the case where the number of items listed in the specified display area S is limited, it is desirable that a setting item with a high use frequency is kept, and a setting item with a low use frequency is updated with a setting item with a higher use frequency than the setting item and the display is performed.

Figure 13:
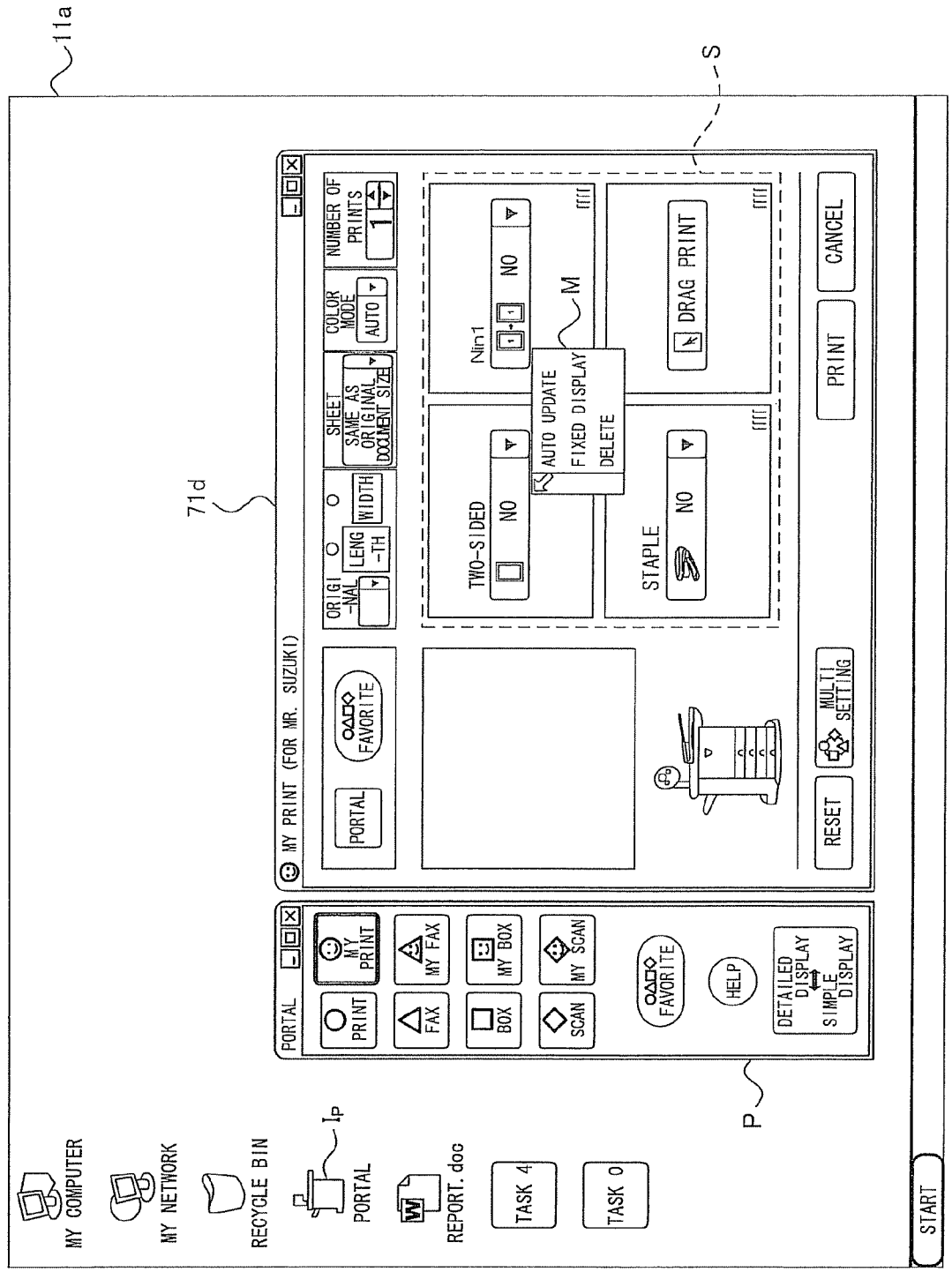
FIG. 13 is a view for explaining setting as to whether a display position of each setting item displayed in the specified display area S is updated or not.

Then, in this embodiment, the user uses a menu M displayed by, for example, right-clicking each setting item displayed in the specified display area S of the print setting screen 71d by a mouse, and can perform setting as to whether the display position of each setting item is updated or not (see FIG. 13). The content of the setting (display setting information) performed using the menu M is registered in the data table stored in the database 3.

The display setting information acquisition unit 116 acquires display setting information to regulate whether a display position of which setting item among plural setting items to be displayed in the specified display area S of the print setting screen 71d is fixed or not from the data table (see FIG. 7).

Based on the display setting information acquired by the display setting information acquisition unit 116, with respect to a setting item, which is set such that its display position is to be fixed, among the setting items to be displayed in the specified display area S, the control unit 113 fixes the display position of the setting item in the specified display area S.

As stated above, with respect to the setting item which is set to be fixedly displayed by the display setting unit, the display position is fixedly displayed irrespective of the use frequency, so that the setting item which is not frequently used but is desired to be always displayed (for example, the setting item important for the user, the setting item troublesome in search through hierarchies) can always be displayed in the specified display area. Incidentally, the setting items to be displayed fixedly include, for example, a setting item set as a setting item to be always displayed by default, and an arbitrary setting item selected based on a mouse input of a user or the like (for example, a display setting menu displayed correspondingly to each setting item by right-clicking).

Besides, in the case where a setting operation concerning a desired setting item is performed by a user on the standard print setting screen 61, based on the information acquired from the database 3 by the item information acquisition unit 112, the setting content determination unit 117 determines whether or not the setting has been performed with respect to a setting item other than the setting items to be displayed in the specified display area S of the print setting screen 71d.

Figure 14:
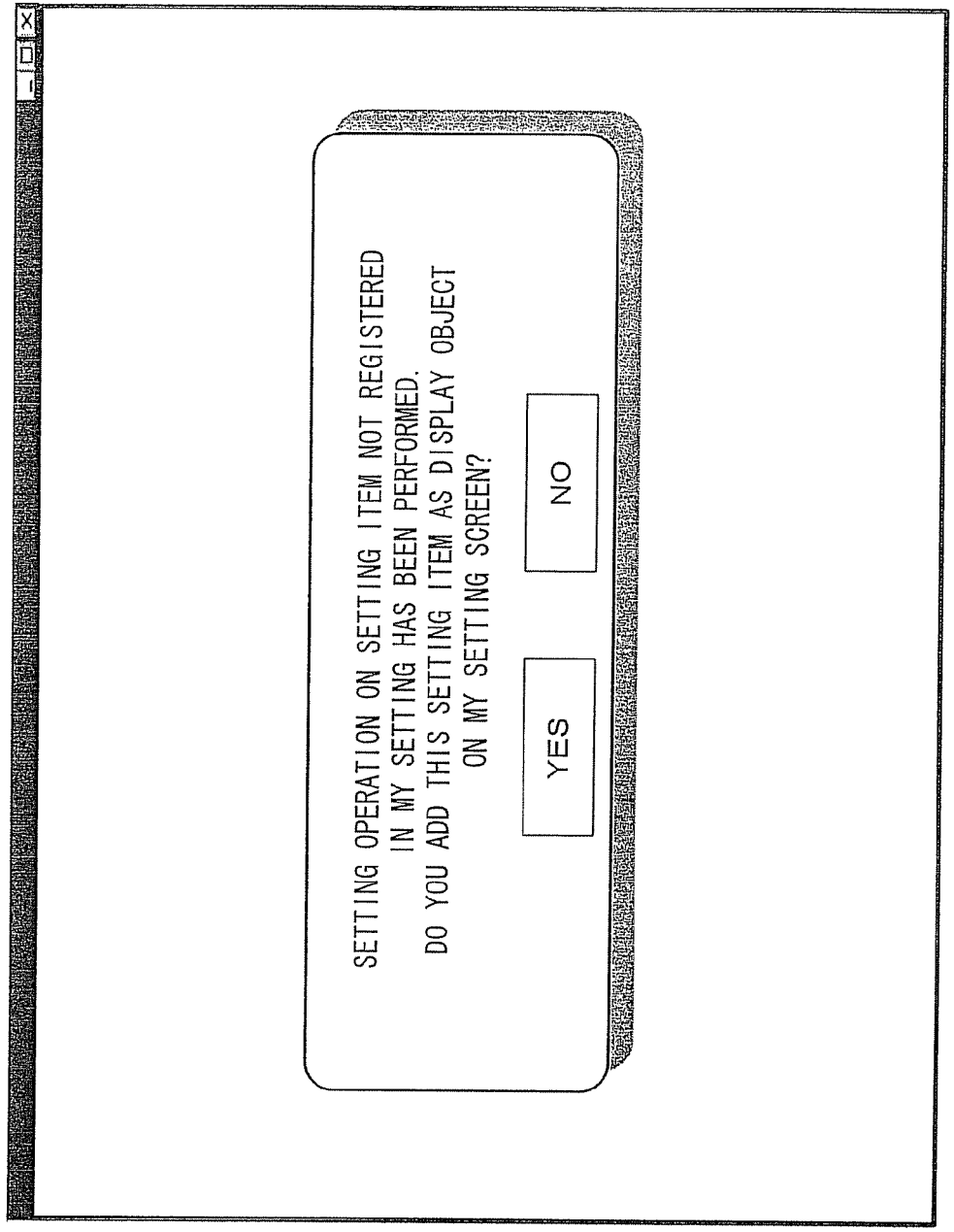
FIG. 14 is a view showing a screen to request an operation input as to whether an unregistered setting item is to be displayed in the specified display area S or not.

In the case where the setting content determination unit 117 determines that the setting has been performed with respect to the setting item other than the setting items registered to be displayed in the specified display area S of the print setting screen 71d, the input request unit 118 performs the screen display as shown in FIG. 14 by the display 11a, and requests an operation input as to whether or not the other setting item is to be displayed in the specified display area S (whether or not it is newly registered as the display object in the specified display area S).

In the case where the operation input to display the other setting item in the specified display area S is received by the operation input unit 11*b* (in the case where "YES" is selected in FIG. 14), the display object management unit 114 registers the other setting item as the setting item to be displayed in the specified display area S into the data table stored in the data base 3.

As described above, since the structure is made such that various setting information is acquired from an external equipment such as the database 3, for example, the setting content set in the PC 11 can be shared by users using the PC 12, . . . , the PC 1*n*, and this can contribute to the improvement in efficiency of the setting work.

The CPU 801 serves to perform various processings in the display control apparatus, and also serves to realize various functions by executing programs stored in the MEMORY 802. The MEMORY 802 includes, for example, a ROM and a RAM, and serves to store various information and programs used in the display control apparatus.

Figure 15:
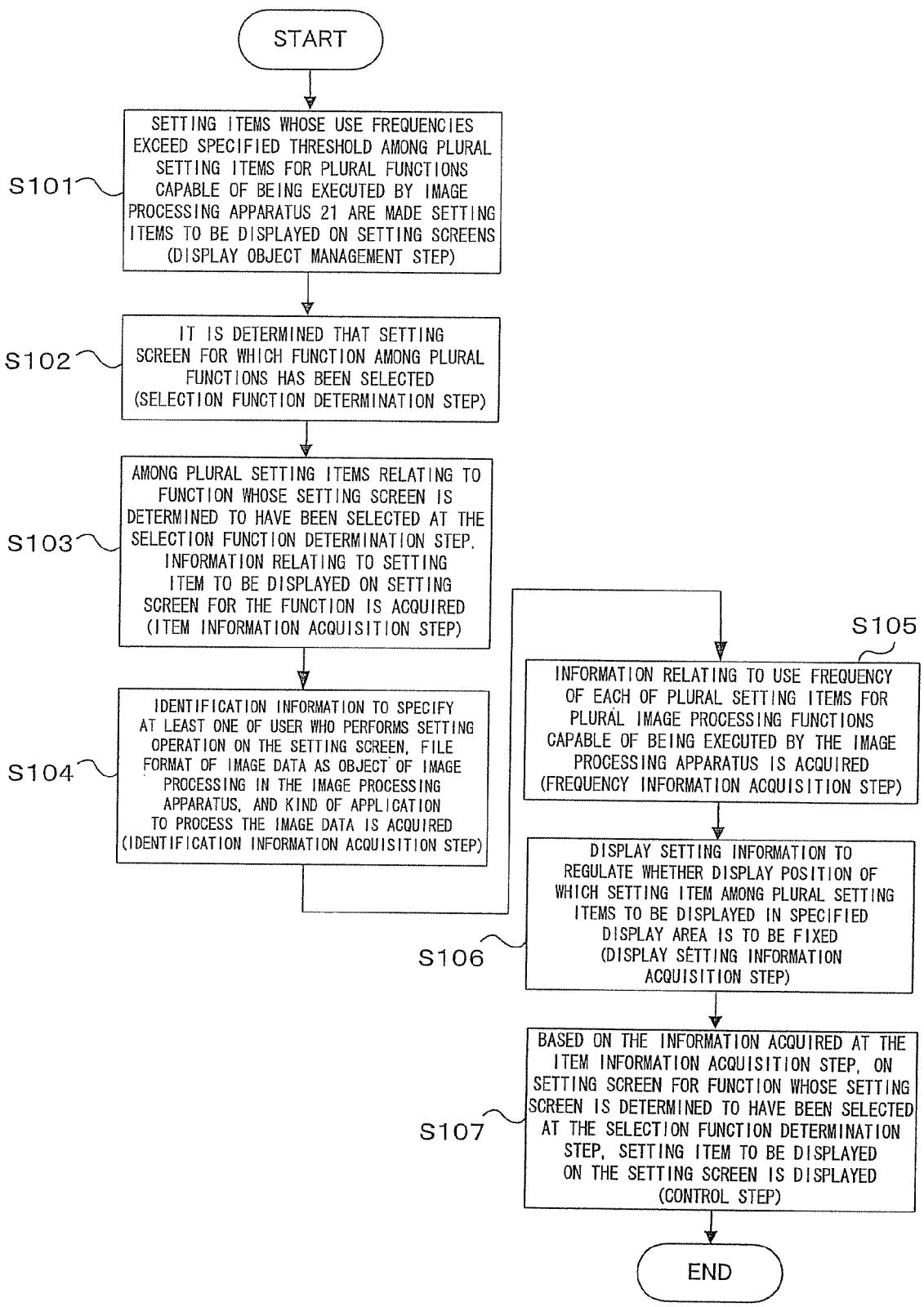
FIG. 15 is a flowchart for explaining a flow of a rough processing (display control method) in the display control apparatus of the embodiment.

FIG. 15 is a flowchart for explaining a flow of a rough processing (display control method) in the display control apparatus according to the embodiment.

The display object management unit 114 causes setting items, the use frequencies of which exceed a specified threshold, among plural setting items for plural functions capable of being executed by the image processing apparatus 21 to become the setting items to be displayed on the setting screen (display object management step) (S101).

The selection function determination unit 111 determines that a setting screen for which function among the plural functions has been selected (selection function determination step) (S102).

The item information acquisition unit 112 acquires, among plural setting items for the function whose setting screen is determined to have been selected at the selection function determination step, information relating to a setting item to be displayed on the setting screen for the function (item information acquisition step) (S103).

The identification information acquisition unit 119 acquires identification information to specify at least one of the user who performs the setting operation on the setting screen, the file format of image data as the object of the image processing in the image processing apparatus, and the kind of the application to process the image data (identification information acquisition step) (S104).

The frequency information acquisition unit 115 acquires information relating to the use frequency of each of the plural setting items for the plural image processing functions capable of being executed by the image processing apparatus (frequency information acquisition step) (S105).

The display setting information acquisition unit 116 acquires display setting information to regulate whether the display position of which setting item among plural setting items to be displayed in the specified display area is fixed or not (display setting information acquisition step) (S106).

Based on the information acquired at the item information acquisition step, the control unit 113 displays, on the setting screen for the function whose setting screen is determined to have been selected at the selection function determination step, the setting items to be displayed on the setting screen (control step) (S107). Besides, in the control step, based on the information acquired at the frequency information acquisition step, a setting item with a high use frequency is displayed to be positioned at at least one side of the left side and the upper side in the specified display area of the setting screen.

Incidentally, in the control step, based on the display setting information acquired at the display setting information acquisition step, with respect to a setting item whose display position is set to be fixed among the setting items to be displayed in the specified display area, the display position of the setting item in the specified display area can be fixed.

Besides, in the control step, it is preferable that based on the information acquired at the identification information acquisition step, the setting item made to correspond to one of the user who performs the setting operation, the file format, and the application is displayed on the setting screen, however, it is not always necessary to perform the extraction of the setting item based on the identification information. For example, in the environment in which plural users belonging to a department use the image processing apparatus 21, there is also a case where it is unnecessary to cause the setting screen to correspond to each user. In such a case, it is preferable that the use frequency of the setting item is not reflected in the setting screen for each user, but the display control of the setting item is performed in which the use frequency of the setting item in the whole department is reflected.

Figure 16:
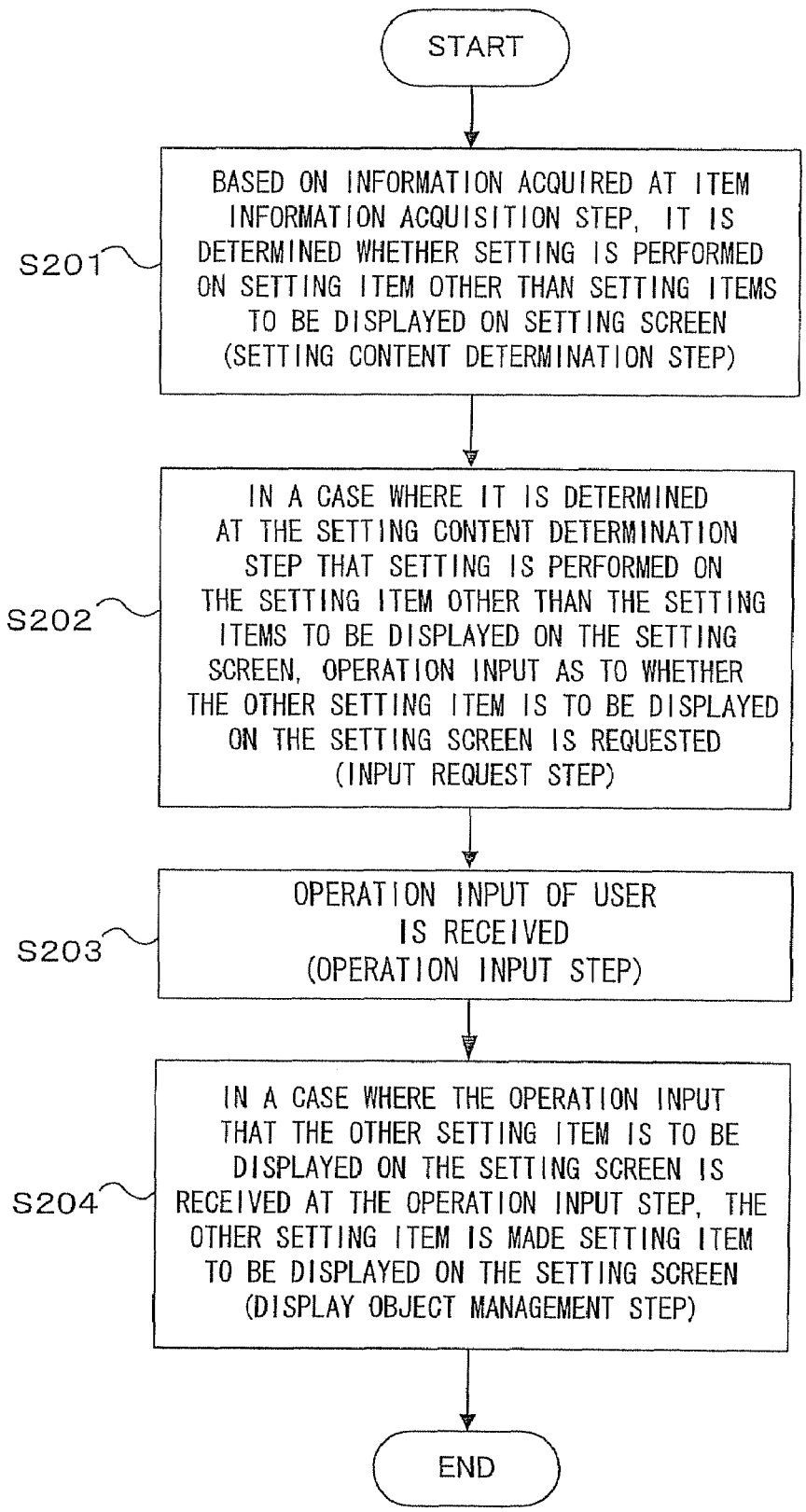
FIG. 16 is a flowchart for explaining a flow of a new registration processing of a setting item in the display control apparatus of the embodiment.

FIG. 16 is a flowchart for explaining a flow of a new registration processing of a setting item in the display control apparatus according to the embodiment.

Based on the information acquired at the item information acquisition step, the setting content determination unit 117 determines whether setting has been performed with respect to a setting item other than the setting items to be displayed on the setting screen (setting content determination step) (S201).

In the case where it is determined at the setting content determination step that the setting has been performed with respect to the setting item other than the setting items to be displayed on the setting screen, the input request unit 118 requests an operation input as to whether or not the other setting item is to be displayed on the setting screen (input request step) (S202).

The operation input unit 11*b* receives the operation input of the user (operation input step) (S203).

In the case where the operation input that the other setting item is to be displayed on the setting screen is received at the operation input step, the display object management unit 114 causes the other setting item to become the setting item to be displayed on the setting screen (display object management step) (S204).

The respective steps of the processing in the display control apparatus are realized by causing the CPU 801 to execute a display control program stored in the MEMORY 802.

In the embodiment, although the description has been made on the case where the function to carry out the invention is previously recorded in the inside of the apparatus, no limitation is made to this, and the same function may be downloaded from a network to the apparatus, or a record medium recording the same function may be installed in the apparatus. As the record medium, any form may be used as long as the record medium, such as a CD-ROM, can store the program and can be read by the apparatus. Besides, the function previously obtained by the installation or download may realize the function in cooperation with an OS (Operating System) inside the apparatus.

Incidentally, in the embodiment, although the example has been described in which the processing concerning the display control of the respective setting items on the setting screen is performed on the PC 11, the processing can be performed on the image processing apparatus 21. That is, the structure may be made such that the image processing apparatus 21 has the functions equivalent to the selection function determination unit 111, the item information acquisition unit 112, the control unit 113, the display object management unit 114, the frequency information acquisition unit 115, the display setting information acquisition unit 116, the setting content determination unit 117, the input request unit 118, the identification information acquisition unit 119, the display 11a, the operation input unit 11b, the CPU 801 and the MEMORY 802.

Besides, in the embodiment, although the example has been described in which the addition registration of the setting item as the display object is mainly performed by the mouse operation, no limitation is made to this, and it is needless to say that the addition registration can be realized by an operation input using a keyboard or a touch panel.

In the embodiment, there is provided the setting screen which includes only setting items frequently used by each user, has no tab structure and can list all functions on one screen, and this can contribute to an improvement in visibility and workability. By this, even with respect to a special setting item, the setting operation can be performed efficiently to the same degree as the function frequently used.

Although the invention has been described in detail with respect to the specific embodiment, it would be apparent for one of ordinary skill in the art that various modifications and improvements can be made without departing from the sprit and scope of the invention.

As described in detail, according to the invention, the technique to contribute to the improvement in convenience of the setting screen for performing the setting for the function capable of being executed by the image processing apparatus can be provided.

What is claimed is:

1. A display control apparatus for causing a plurality of setting screens to be selectively displayed, which are respectively for performing settings for a plurality of functions capable of being executed by an image processing apparatus and on each of which a plurality of setting items for each of the functions can be displayed, the display control apparatus comprising:
 a processor configured to execute:
  a selection function determination unit to determine that a setting screen for which function among the plurality of functions has been selected;
  a frequency information acquisition unit to acquire information relating to use frequencies of the plurality of setting items for the plurality of image processing functions capable of being executed by the image processing apparatus;
  a display object management unit to cause setting items whose use frequencies exceed a specified threshold among the plurality of setting items for the plurality of functions capable of being executed by the image processing apparatus to become the setting items to be displayed in a specified display area of the setting screens;
  an item information acquisition unit to acquire information relating to, among the plurality of setting items relating to the function whose setting screen is determined to have been selected by the selection function determination unit, the setting items to be displayed on the setting screen for the function;
  a setting menu displaying unit to display a setting menu to set whether a display position of each setting item is fixed;
  a display setting information acquisition unit to acquire display setting information, based on the content of setting performed using the setting menu, to regulate whether the display position of which setting item among the plurality of setting items to be displayed in the specified display area is to be fixed; and
  a control unit to display, based on the information acquired by the item information acquisition unit and the frequency information acquisition unit, and on the setting screen for the function whose setting screen is determined to have been selected by the selection function determination unit, the setting item to be displayed with a high use frequency to be positioned at at least one side of a left side and an upper side in the specified display area, and to fix, based on the display setting information acquired by the display setting information acquisition unit and with respect to the setting item whose display position is set to be fixed among the setting items to be displayed in the specified display area, the display position of the setting item in the specified display area.

2. The display control apparatus according to claim 1, further comprising:
 a setting content determination unit to determine, based on the information acquired by the item information acquisition unit, whether setting has been performed on a setting item other than the setting items to be displayed on the setting screen;
 an input request unit to request, in a case where it is determined by the setting content determination unit that the setting has been performed on the setting item other than the setting items to be displayed on the setting screen, an operation input as to whether the other setting item is to be displayed on the setting screen; and
 an operation input unit to receive the operation input of a user,
 wherein the display object management unit causes the other setting item to become the setting item to be displayed on the setting screen in a case where the operation input to display the other setting item on the setting screen is received by the operation input unit.

3. The display control apparatus according to claim 1, wherein the item information acquisition unit acquires, among the plurality of setting items relating to the function whose setting screen is determined to have been selected by the selection function determination unit, information about a setting item to be displayed on the setting screen for the function from an external equipment connected to the display control apparatus to be capable of communicating.

4. The display control apparatus according to claim 1, further comprising an identification information acquisition unit to acquire identification information to specify one of a user who performs a setting operation on the setting screen, a file format of image data as an object of an image processing in the image processing apparatus and a kind of an application to process the image data,
 wherein the control unit displays on the setting screen, based on the information acquired by the identification information acquisition unit, a setting item made to correspond to at least one of the user who performs the setting operation, the file format and the application.

5. A display control method for a display control apparatus causing a plurality of setting screens to be selectively displayed, which are respectively for performing settings for plural functions capable of being executed by an image processing apparatus and on each of which a plurality of setting items for each of the functions can be displayed, the display control method comprising:

a selection function determination step of determining that a setting screen for which function among the plurality of functions has been selected;

a frequency information acquisition step of acquiring information relating to the use frequencies of the plurality of setting items for the plurality of image processing functions capable of being executed by the image processing apparatus;

a display object management step of causing setting items whose use frequencies exceed a specified threshold among the plurality of setting items for the plurality of functions capable of being executed by the image processing apparatus to become the setting items to be displayed on the setting screens;

an item information acquisition step of acquiring information relating to, among the plurality of setting items relating to the function whose setting screen is determined to have been selected at the selection function determination step, the setting items to be displayed on the setting screen for the function;

a setting menu displaying step of displaying a setting menu to set whether a display position of each setting item is fixed;

a display setting information acquisition step of acquiring display setting information to regulate whether a display position of which setting item among the plurality of setting items to be displayed in the specified display area is to be fixed; and a control step of displaying, based on the information acquired at the item information acquisition step and at the frequency information acquisition step, and on the setting screen for the function whose setting screen is determined to have been selected at the selection function determination step, the setting item to be displayed with a high use frequency to be positioned at at least one side of a left side and an upper side in the specified display area, and to fix, based on the display setting information acquired by the display setting information acquisition unit and with respect to the setting item whose display position is set to be fixed among the setting items to be displayed in the specified display area, the display position of the setting item in the specified display area.

6. The display control method according to claim 5, further comprising:

a setting content determination step of determining, based on the information acquired at the item information acquisition step, whether setting has been performed on a setting item other than the setting items to be displayed on the setting screen;

an input request step of requesting, in a case where it is determined at the setting content determination step that the setting has been performed on the setting item other than the setting items to be displayed on the setting screen, an operation input as to whether the other setting item is to be displayed on the setting screen; and an operation input step of receiving the operation input of a user, wherein the display object management step causes the other setting item to become the setting item to be displayed on the setting screen in a case where the operation input to display the other setting item on the setting screen is received at the operation input step.

7. The display control method according to claim 5, wherein the item information acquisition step acquires, among the plurality of setting items relating to the function whose setting screen is determined to have been selected at the selection function determination step, information about a setting item to be displayed on the setting screen for the function from an external equipment connected to the display control apparatus to be capable of communicating.

8. The display control method according to claim 5, further comprising an identification information acquisition step of acquiring identification information to specify one of a user who performs a setting operation on the setting screen, a file format of image data as an object of an image processing in the image processing apparatus and a kind of an application to process the image data, wherein the control step displays on the setting screen, based on the information acquired at the identification information acquisition step, a setting item made to correspond to at least one of the user who performs the setting operation, the file format and the application.

9. A computer-readable storage medium storing a display control program for causing a computer to execute a display control process in a display control apparatus causing a plurality of setting screens to be selectively displayed, which are respectively for performing settings for a plurality of functions capable of being executed by an image processing apparatus and on each of which a plurality of setting items for each of the functions can be displayed, the display control program causing the computer to execute:

a selection function determination step of determining that a setting screen for which function among the plurality of functions has been selected;

a frequency information acquisition step of acquiring information relating to the use frequencies of the plurality of setting items for the plurality of image processing functions capable of being executed by the image processing apparatus;

a display object management step of causing setting items whose use frequencies exceed a specified threshold among the plurality of setting items for the plurality of functions capable of being executed by the image processing apparatus to become the setting items to be displayed on the setting screens;

an item information acquisition step of acquiring information relating to, among the plurality of setting items relating to the function whose setting screen is determined to have been selected at the selection function determination step, the setting items to be displayed on the setting screen for the function;

a setting menu displaying step of displaying a setting menu to set whether a display position of each setting item is fixed;

a display setting information acquisition step of acquiring display setting information to regulate whether a display position of which setting item among the plurality of setting items to be displayed in the specified display area is to be fixed; and a control step of displaying, based on the information acquired at the item information acquisition step and at the frequency information acquisition step, and on the setting screen for the function whose setting screen is determined to have been selected at the selection function determination step, the setting item to be displayed with a high use frequency to be positioned at least one side of a left side and an upper side in the specified display area, and to fix, based on the display setting information acquired by the display setting information acquisition unit and with respect to the setting item whose display position is set to be fixed among the setting items to be displayed in the specified display area, the display position of the setting item in the specified display area.

10. The computer-readable storage medium according to claim 9, the display control program further comprising:
a setting content determination step of determining, based on the information acquired at the item information acquisition step, whether setting has been performed on a setting item other than the setting items to be displayed on the setting screen;
an input request step of requesting, in a case where it is determined at the setting content determination step that the setting has been performed on the setting item other than the setting items to be displayed on setting screen, an operation input as to whether the other setting item is to be displayed on the setting screen; and
an operation input step of receiving the operation input of a user, wherein the display object management step causes the other setting item to become the setting item to be displayed on the setting screen in a case where the operation input to display the other setting item on the setting screen is received at the operation input step.

11. The computer-readable storage medium according to claim 9, wherein the item information acquisition step acquires, among the plurality of setting items relating to the function whose setting screen is determined to have been selected at the selection function determination step, information about a setting item to be displayed on the setting screen for the function from an external equipment connected to the display control apparatus to be capable of communicating.

* * * * *